United States Patent
Yahaba (10) Patent No.: US 9,760,261 B2
(45) Date of Patent: Sep. 12, 2017

(54) DISPLAY APPARATUS FOR DISPLAYING AT LEAST AN IMAGE OF A MOVABLE STRUCTURE OF THE NUMERICAL CONTROLLER MACHINE TOOL

(71) Applicant: DMG MORI SEIKI CO., LTD., Nara (JP)

(72) Inventor: Hiroshi Yahaba, Sapporo (JP)

(73) Assignee: DMG MORI SEIKI CO., LTD., Nara (JP)

( * ) Notice: Subject to any disclaimer, the term of this patent is extended or adjusted under 35 U.S.C. 154(b) by 556 days.

(21) Appl. No.: 14/457,182

(22) Filed: Aug. 12, 2014

(65) Prior Publication Data

US 2015/0066212 A1 Mar. 5, 2015

(30) Foreign Application Priority Data

Aug. 28, 2013 (JP) .................................. 2013-176609

(51) Int. Cl.
*G05B 13/00* (2006.01)
*G06F 3/0484* (2013.01)
(Continued)

(52) U.S. Cl.
CPC ....... *G06F 3/04842* (2013.01); *G05B 19/409* (2013.01); *G05B 19/4069* (2013.01); *G06F 3/0488* (2013.01); *G06F 3/04845* (2013.01)

(58) Field of Classification Search
CPC .................................................. G06F 3/04842
(Continued)

(56) References Cited

U.S. PATENT DOCUMENTS 5,392,502 A 2/1995 Freer
6,055,461 A 4/2000 Sumiyama et al.
(Continued)

FOREIGN PATENT DOCUMENTS

JP 07295625 11/1995
JP 2006085328 A 3/2006
(Continued)

OTHER PUBLICATIONS

Mankovich, Nicholas J., Andrew M. Cheeseman, and Noel G. Stoker. "The display of three-dimensional anatomy with stereolithographic models." Journal of digital imaging 3.3 (1990): pp. 200-203.*
(Continued)

*Primary Examiner* — Satish Rampuria
(74) *Attorney, Agent, or Firm* — Miller, Matthias & Hull LLP (57) ABSTRACT

A display apparatus capable of displaying images of movable structures includes a data storage unit for storing image data and a display control unit which receives signals relating to positions of movable structures from a numerical controller and reads out image data relating to the received movable structures from the storage unit, and generates a display image in which images of the movable structures are arranged to have a positional relationship received and displays the display image on the display. When a selection signal for selecting a movable structure to be operated is input to the numerical controller from an input device, the display control unit receives the selection signal and generates a display image in which the image of the movable structure corresponding to the received selection signal is highlighted and displays the display image on the display.

4 Claims, 5 Drawing Sheets

(51) Int. Cl.
*G05B 19/4069* (2006.01)
*G05B 19/409* (2006.01)
*G06F 3/0488* (2013.01)

(58) Field of Classification Search
USPC .................................................. 700/275–306
See application file for complete search history.

(56) References Cited

U.S. PATENT DOCUMENTS

| | | | | |
|---|---|---|---|---|
| 6,269,283 | B1* | 7/2001 | Shinozaki | G05B 19/4061 700/172 |
| 2006/0156025 | A1* | 7/2006 | Shibui | G05B 19/409 713/183 |
| 2008/0086220 | A1* | 4/2008 | Ogawa | G05B 19/4069 700/15 |
| 2011/0231787 | A1* | 9/2011 | Tseo | G05B 19/409 715/771 |
| 2013/0006391 | A1* | 1/2013 | Kito | G05B 19/409 700/11 |

FOREIGN PATENT DOCUMENTS

| | | |
|---|---|---|
| JP | 2006331012 A | 12/2006 |
| JP | 2007334551 A | 12/2007 |

OTHER PUBLICATIONS

Kussul, Ernst M., et al. "Micromechanical engineering: a basis for the low-cost manufacturing of mechanical microdevices using microequipment." Journal of Micromechanics and Microengineering 6.4 (1996): pp. 410-425.*

Chen, Jenq-Shyong. "Computer-aided accuracy enhancement for multi-axis CNC machine tool." International Journal of Machine Tools and Manufacture 35.4 (1995): pp. 593-605.*

* cited by examiner

DISPLAY APPARATUS FOR DISPLAYING AT LEAST AN IMAGE OF A MOVABLE STRUCTURE OF THE NUMERICAL CONTROLLER MACHINE TOOL

FIELD OF THE DISCLOSURE

The present disclosure relates to a display apparatus which is connected to an NC machine tool for displaying at least an image of a movable structure of the NC machine tool.

BACKGROUND OF THE DISCLOSURE

In the field of numerically controlled industrial machinery such as machine tools and robots, generally, movable structures such as a tool rest, a spindle head, a robot arm and the like can be operated by manual operations, such as jog feed and pulse feed, as well as by an automatic operation.

Further, operation keys for jog feed and a pulse handle for pulse feed are usually disposed on an operation panel, and operation signals input from the operation keys and the pulse handle are to be transmitted to a numerical controller.

When a movable structure is operated by a manual operation, the operator might perform an operation different from his intended operation due to misrecognition, for example, selecting a wrong axis of movement of a robot arm or moving the movable structure in a wrong direction. This is a so-called artificial error, and performing such a wrong operation might possibly cause a serious accident such that the movable structure operated collides with another structure.

Therefore, in order to prevent such a wrong operation, a display apparatus is proposed in Japanese Unexamined Patent Application Publication No. H7-295625 ("JP '625"). This display apparatus has a display device (CRT monitor) on which a graphics image is displayed, and a display controller which displays, on a screen of the display device, an image representing the contents of a jog mode executed by a robot controller along with an image representing a robot.

In this display apparatus, for example, 1) when the robot controller executes "tool feed mode", the display controller displays on the display device an image of each axis of the tool coordinate system superposed on a graphics image representing the vicinity of a robot arm end and a hand, and 2) when the robot controller executes "robot coordinate system feed mode", the display controller displays on the display device an image of each axis of the base coordinate system superposed on an image of the entire robot including the robot base. Further, 3) when the robot controller executes "user coordinate system feed mode", the display controller displays on the display device an image of each axis of the user coordinate system superposed on an image of the entire robot, and 4) when the robot controller executes "each axis feed mode", the display controller displays on the display device an image for indicating the position and direction of movement of each axis superposed on an image of the entire robot.

Further, the display controller is configured to be capable of highlighting the coordinate axis corresponding to the jog feed direction; for example, causing the corresponding coordinate axis to blink or changing the display color of the corresponding coordinate axis.

Thus, according to this conventional display apparatus, because the operator can easily recognize the jog mode in the form of an image before or during execution of jog feed, it is prevented that jog feed is started or continued in a state where the jog mode is wrongly recognized. Further, because the direction in which jog feed can be executed or the direction in which jog feed is being executed is recognized in the form of an image, it is possible to execute jog feed without a feeling of uneasiness and it is possible to improve the efficiency of a teaching operation using jog feed. Furthermore, highlighting the in-execution jog feed direction in the graphics display makes it possible to cause the operator to recognize the jog feed direction more definitely.

SUMMARY OF THE DISCLOSURE

However, in the field of machine tools, some types of machine tools have a plurality of movable structures, and such a machine tool has a problem that, in a case where the movable structures are positioned close to each other, if an image of a feed axis (feed direction) for a movable structure to be operated is arranged and displayed near an image of the movable structure similarly to the above-described conventional display apparatus, the operator cannot easily distinguish for which movable structure the displayed feed axis image is displayed just by looking at the displayed feed axis image.

Further, since the recognition of the movable structure to be operated through the feed axis image is indirect in itself, it might possibly cause the operator's misrecognition or a wrong operation, on the contrary.

In view of the above-described circumstances, a display apparatus is provided which enables the operator to, when on a machine tool having a plurality of movable structures, selectively manually operating the plurality of movable structures, easily recognize which movable structure is an object to be operated.

To solve the above-described problems, a display apparatus is connected to a machine tool having a plurality of movable structures, a driving mechanism driving the movable structures, a numerical controller controlling operation of the driving mechanism, and an input device for inputting an operation signal to the numerical controller, and which displays at least an image relating to the movable structures, comprising:

a display on which the image is displayed;

a display image data storage unit storing therein data on the image for displaying the image on the display; and a display control unit which receives a signal relating to a position of each of the movable structures from the numerical controller and reads out image data relating to the received movable structures from the display image data storage unit, generates a display image in which images of the movable structures are arranged to have a received positional relationship, and displays the generated display image on the display, wherein the display control unit further, when a selection signal for selecting a movable structure to be operated is input to the numerical controller from the input device, receives the selection signal and generates the display image with a highlighted image of the movable structure corresponding to the received selection signal, and displays the generated display image on the display.

According to the display apparatus of the present disclosure, at least an image relating to the movable structures is displayed on the display by the display control unit. The image displayed by the display control unit includes at least images of the movable structures, and an image of a fixed structure of the machine tool may be displayed along therewith.

The display image of the movable structures is generated by, on the basis of a signal relating to the position of each movable structure, which is received from the numerical controller, and image data relating to the received movable structures, which is stored in the display image data storage unit, arranging images of the movable structures so that they have a received positional relationship, and the display control unit displays the generated display image on the display.

Thereby, even when a door for insulating a machining region of the machine tool from the outside is closed and therefore structures, such as the movable structures, disposed in the machining region cannot be directly visually recognized, the operator can grasp the positional relationship of the structures by checking the image displayed on the display.

Further, when the operator operates a movable structure by a manual operation, the display control unit receives a selection signal for selecting the movable structure to be operated, which is input to the numerical controller from the input device, generates the display image with a highlighted image of the movable structure corresponding to the selection signal, and displays the generated display image on the display. It is noted that, as for the highlighted display, a mode in which the display color of the selected movable structure is made different from that of the other structures, a mode in which the profile of the selected movable structure is made thicker than those of the other structures, or a mode in which the selected movable structure is displayed in a blinking manner can be employed.

Thereby, the operator can very easily distinguish the movable structure he is going to operate by the manual operation by checking the image displayed on the display, that is, by checking to which movable structure the highlighted image corresponds. Therefore, if the operator is going to operate a movable structure different from his intended one, the operator can easily recognize that by checking the display image on the display, and thereby it is possible to effectively prevent the occurrence of a collision accident caused by moving a not-intended movable structure by a wrong operation.

In the present disclosure, the display control unit may be configured to generate the display image to which an image relating to an axis of movement of the movable structure corresponding to the selection signal input from the input device is added, and display the generated display image on the display. Thereby, the operator can recognize the direction in which the selected movable structure can be moved by the manual operation by checking the display image on the display, and can easily recognize in which direction the movable structure is moved by the operation or whether the movable structure can be moved in his intended direction.

Further, in the present disclosure, the display control unit may be configured to, when a signal relating to an axis of movement is input to the numerical controller from the input device, generate the display image to which an image relating to the corresponding axis of movement is added, or, in a case of generating the display image to which an image relating to another axis of movement is added, generate the display image with a highlighted image relating to the input axis of movement, and display the generated display image on the display. It is noted that, as for the highlighted display, a mode in which the display color of the selected axis of movement is different from that of the another axis of movement, a mode in which the selected axis of movement is displayed to be thicker than the another axis of movement, or a mode in which the selected axis of movement is displayed in a blinking manner can be employed.

When thus configured, the operator can easily recognize the direction in which the selected movable structure is moved by the manual operation by checking the display image on the display, and easily recognize whether the movable structure is being moved in his intended direction. Thereby, it is possible to effectively prevent the occurrence of a collision accident caused by movement of the movable structure in a not-intended direction due to an operator's wrong operation.

In the present disclosure, the image displayed on the display may be a two-dimensional image or a three-dimensional image.

As described above, according to the display apparatus of the present disclosure, since the movable structure the operator is going to operate by a manual operation is highlighted on the display, the operator can very easily recognize which movable structure he is going to operate by checking the highlighted image. Thereby, it is possible to effectively prevent the occurrence of a collision accident caused by moving a movable structure which is not intended by the operator.

Further, by displaying the display image to which an image relating to an axis of movement of the selected movable structure is added on the display, the operator can recognize the direction in which the selected movable structure can be moved by the manual operation, and therefore the operator can easily recognize in which direction the movable structure is moved by the operation or whether the movable structure can be moved in his intended direction.

Further, by, when a signal relating to an axis of movement is input from the input device, displaying an image relating to the corresponding axis of movement on the display or displaying it in a highlighted manner on the display, the operator can easily recognize the direction in which the selected movable structure is moved by the manual operation, and therefore the operator can easily recognize whether the movable structure is being moved in his intended direction. Thereby, it is possible to effectively prevent the occurrence of a collision accident caused by movement of the movable structure in a not-intended direction due to an operator's wrong operation.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Figure 1:
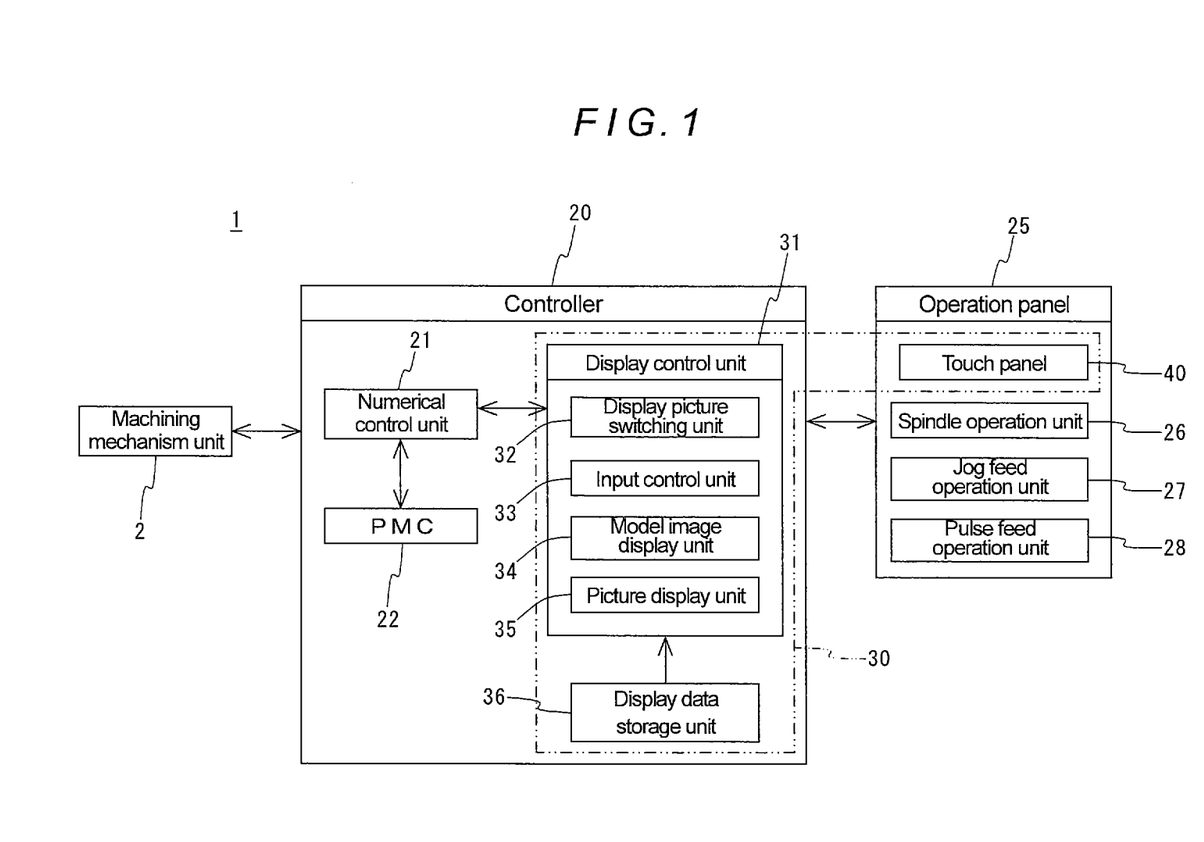
FIG. 1 is a block diagram showing a schematic configuration of a display apparatus etc. according to one embodiment of the present disclosure.

Hereinafter, a specific embodiment of the present disclosure will be described with reference to the drawings. As shown in FIG. 1, a display apparatus 30 of this embodiment is configured to be incorporated in a machine tool 1 and includes a display control unit 31 and a touch panel 40. Hereinafter, each component will be described.

Configuration of Machine Tool

First, a schematic configuration of the machine tool 1 of this embodiment is described. It is noted that FIGS. 3 and 4 are illustrations showing a display screen of the touch panel 40 and the reference numerals in parentheses in the figures indicate components of the machine tool 1.

As shown in FIG. 1, the machine tool 1 of this embodiment includes a machining mechanism unit 2, a controller 20 and an operation panel 25.

Figure 3:
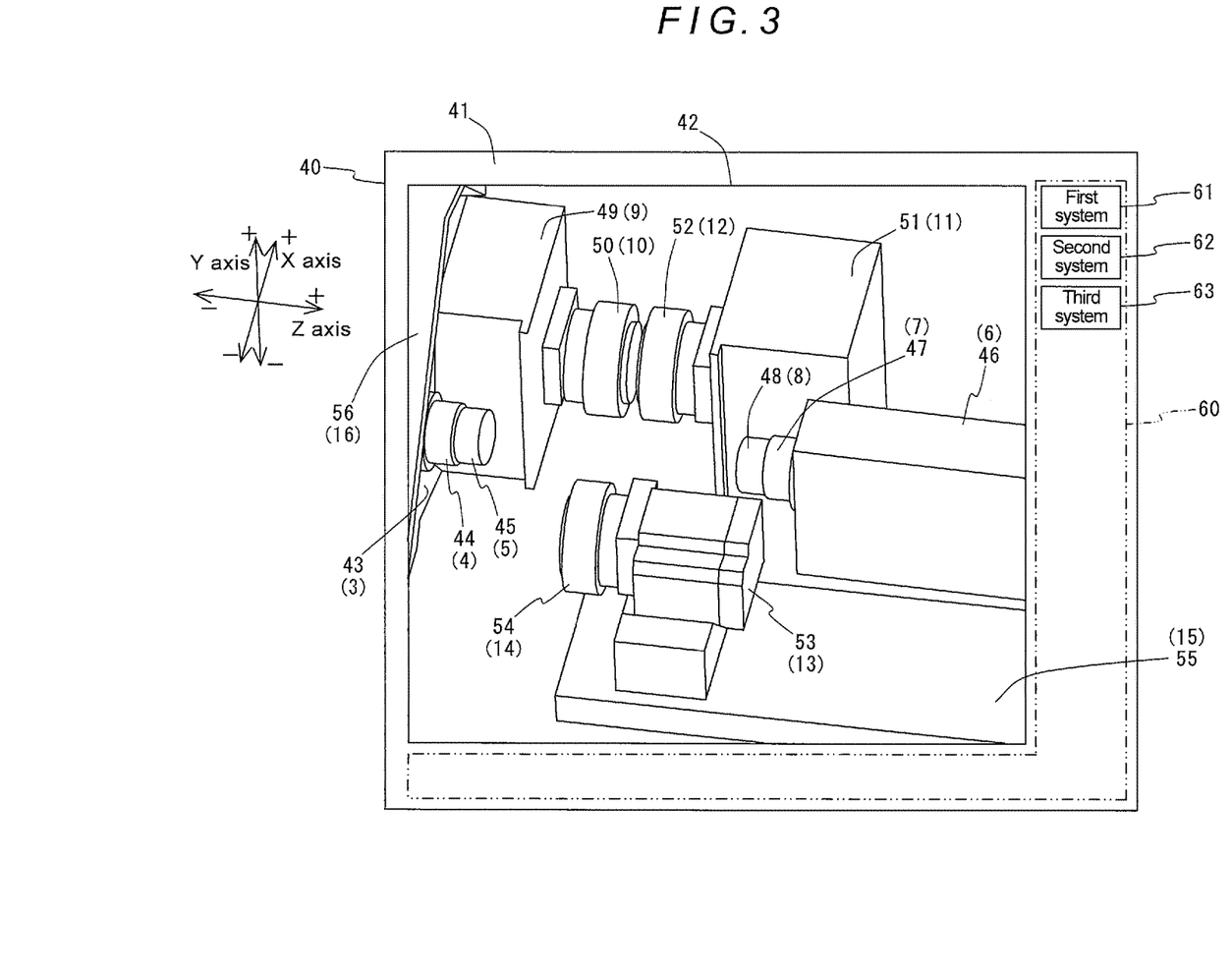
FIG. 3 is an illustration showing a display image according to the embodiment.
Figure 4:
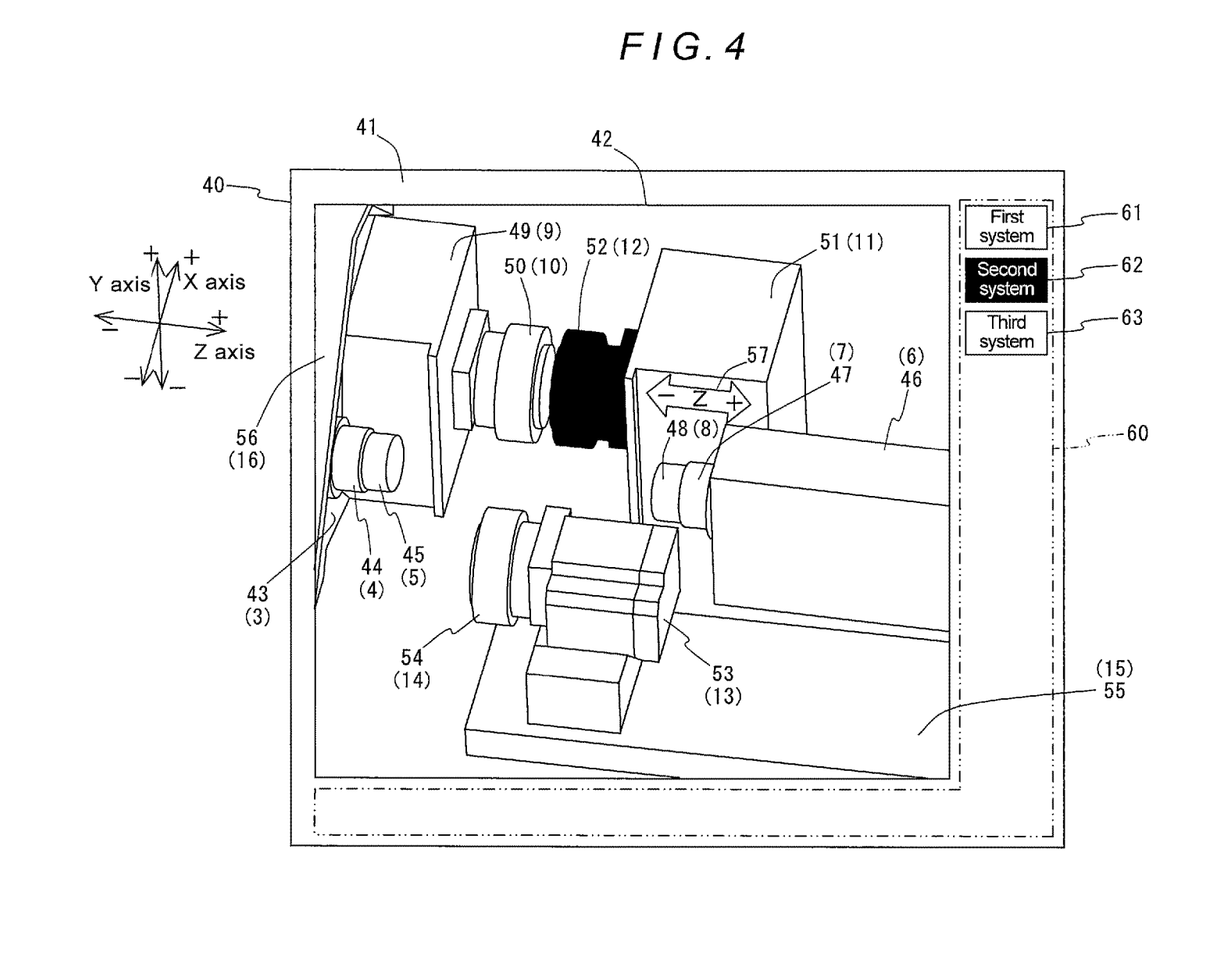
FIG. 4 is an illustration showing a display image according to the embodiment.

The machining mechanism unit 2 includes a bed (not shown), and a first headstock 3, a second headstock 6, a first tool rest 9, a second tool rest 11 and a third tool rest 13 shown in FIGS. 3 and 4, which are disposed on the bed (not shown), etc. The first headstock 3 has a first spindle 4 and a first chuck 5 disposed on an axial end of the first spindle 4, and, on the other hand, the second headstock 6 has a second spindle 7 and a second chuck 8 disposed on an axial end of the second spindle 7. The first headstock 3 and the second headstock 6 are disposed coaxially so that the first chuck 5 and the second chuck 8 face each other. It is noted that the first spindle 4 and the second spindle 7 are each driven by an appropriate drive motor to rotate about their respective axes.

Further, when seen from the operator's operation side, the first tool rest 9 and the second tool rest 11 are disposed behind the axes of the first spindle 4 and the second spindle 7, and, on the other hand, the third tool rest 13 is disposed in front of the axes of the first spindle 4 and the second spindle 7. The first tool rest 9 and the second tool rest 11 are disposed so that a first turret 10 and a second turret 12 which are respectively provided thereon face each other, and they are each moved in the directions of three orthogonal axes: X axis, Y axis and Z axis, by an appropriate feed mechanism. Further, the third tool rest 13 has a third turret 14 and is similarly moved in the X-axis, Y-axis and Z-axis directions by an appropriate feed mechanism. Further, the first turret 10, the second turret 12 and the third turret 14 are each driven by an appropriate drive motor to rotate about their respective axes along the Z-axis direction.

It is noted that, in the machine tool 1 of this embodiment, the operational system of the first tool rest 9 is called "first system", the operational system of the second tool rest 11 is called "second system", and the operational system of the third tool rest 13 is called as "third system". Further, the first spindle 4, the first chuck 5, the second spindle 7, the second chuck 8, the first tool rest 9, the first turret 10, the second tool rest 11, the second turret 12, the third tool rest 13 and the third turret 14 are the movable structures according to the present disclosure.

The controller 20 has, as shown in FIG. 1, a numerical control unit 21, a programmable machine controller (PMC) 22 and the display control unit 31. It is noted that, as described above, the display control unit 31 is a constituent of the display apparatus 30 and detailed explanation thereof will be described later.

The numerical control unit 21 controls the rotations of the first spindle 4 and the second spindle 7 and numerically controls the movements of the first tool rest 9, the second tool rest 11 and the third tool rest 13 in accordance with an NC program. Further, the PMC 22 controls operations of the first chuck 5, the second chuck 8, the first turret 10, the second turret 12 and the third turret 14, etc. in accordance with a predetermined operation program. Further, besides the control based on the programs, the numerical control unit 21 and the PMC 22 receive a manual operation signal input from the operation panel 25, which will be described later, and control the rotations of the first spindle 4 and the second spindle 7, the movements of the first tool rest 9, the second tool rest 11 and the third tool rest 13, and the operations of the first chuck 5, the second chuck 8, the first turret 10, the second turret 12 and the third turret 14, etc. in accordance with the received manual operation signal.

The operation panel 25 has the touch panel 40, a spindle operation unit 26, a jog feed operation unit 27, and a pulse feed operation unit 28, etc. It is noted that, as described above, the touch panel 40 is a constituent of the display apparatus 30 and detailed explanation thereof will be described later.

The spindle operation unit 26 is an input equipment for inputting to the controller 20 signals for manually rotating the first spindle 4 and the second spindle 7, and includes, for example, selection keys for selecting an object to be rotated from the first spindle 4 and the second spindle 7 and driving keys for rotating the object to be rotated in a predetermined direction: a clockwise direction or a counterclockwise direction.

The jog feed operation unit 27 is an input equipment for inputting to the controller 20 signals for moving the first tool rest 9, the second tool rest 11 and the third tool rest 13 by jog feed, and, in this embodiment, has 6 keys for inputting jog feed directions: X-axis +, X-axis −, Y-axis +, Y-axis −, Z-axis + and Z-axis −.

The pulse feed operation unit 28 is an input portion for inputting to the controller 20 signals for moving the first tool rest 9, the second tool rest 11 and the third tool rest 13 by pulse feed, and has a pulse handle for generating a pulse signal, and keys for selecting one from the feed axes, that is, the X axis, the Y axis and the Z axis.

It is noted that the keys, switches and pulse handle, etc. for manual operations, which are provided on the operation panel 25, have configurations well known in the field of machine tools, and their configurations are not limited to the above-described ones also in this embodiment.

Configuration of Display Apparatus

As described above, the display apparatus 30 includes the display control unit 31, which is provided in the controller 20, a display data storage unit 36, and the touch panel 40, which is provided on the operation panel 25.

The touch panel 40 as a display has, as shown in FIGS. 3 and 4, a predetermined display region 41, and, when the operator touches a predetermined portion of the display region 41, the touch panel 40 transmits this touch as an input signal to the display control unit 31.

The display data storage unit 36 is a functional unit for storing data for displaying images and soft keys in the display region 41 of the touch panel 40, and, in this embodiment, data relating to an image of a three-dimensional model of the machining mechanism unit 2, that is, an image 43 of the first headstock 3, an image 44 of the first spindle 4, an image 45 of the first chuck 5, an image 46 of the second headstock 6, an image 47 of the second spindle 7, an image 48 of the second chuck 8, an image 49 of the first tool rest 9, an image 50 of the first turret 10, an image 51 of the second tool rest 11, an image 52 of the second turret 12, an image 53 of the third tool rest 13, an image 54 of the third turret 14, an image 55 of a bed cover 15 and an image 56 of a front door 16, and data relating to a "first system" key 61, a "second system" key 62 and a "third system" key 63, etc. are previously stored therein as appropriate.

The display control unit 31, as shown in FIG. 1, includes a display picture switching unit 32, an input control unit 33, a model image display unit 34 and a picture display unit 35.

The display picture switching unit 32 is a processing unit which sets a region of a picture to be displayed in the display region 41 of the touch panel 40. For example, in an example shown in FIGS. 3 and 4, the display picture switching unit 32 sets an image display region 42 where model images of structures of the machine tool 1 are displayed, and a soft key display region 60 where soft keys are displayed, which is arranged outside the image display region 42. It is noted that the display picture switching unit 32 is configured to be capable of setting, besides the above-mentioned pictures, conventionally well-known various display pictures, such as a picture displaying an NC program, a picture displaying the numbers of rotation of the first spindle 4 and the second spindle 7, a picture displaying the current positions of the first tool rest 9, the second tool rest 11 and the third tool rest 13, etc.

The picture display unit 35 is a processing unit which displays pictures in regions other than the image display region 42 in the display region 41, which regions are set by the display picture switching unit 32. For example, the picture display unit 35 reads out the display data relating to soft keys stored in the display data storage unit 36 and displays predetermined soft keys in the soft key display region 60 shown in FIGS. 3 and 4. In the example shown in FIGS. 3 and 4, the "first system" key 61 indicating the operational system of the first tool rest 9, the "second system" key 62 indicating the operational system of the second tool rest 11 and the "third system" key 63 indicating the operational system of the third tool rest 13 are displayed in an upper portion of the right side of the soft key display region 60.

Additionally, for example, when displaying the NC program, the picture display unit 35 receives data relating to the NC program from the numerical control unit 21 and displays the NC program. When displaying the numbers of rotation of the first spindle 4 and the second spindle 7 and when displaying the current positions of the first tool rest 9, the second tool rest 11 and the third tool rest 13, similarly the picture display unit 35 receives data relating thereto from the numerical control unit 21 and display them.

When an input signal is input from the touch panel 40, the input control unit 33 receives the input signal, and refers to the display contents displayed by the picture display unit 35 and transmits a signal corresponding to the displayed contents to the numerical control unit 21. For example, in FIG. 4, when the "second system" key 62 that is a soft key is pressed and a signal thereof is input from the touch panel 40, the input control unit 33 transmits to the numerical control unit 21 a selection signal indicating that the second tool rest 11 that is the "second system" is selected. At this time, the picture display unit 35 reverses the black and white of the pressed soft key (in this example, the "second system"key 62) and thereby represents that the soft key is pressed.

Figure 2:
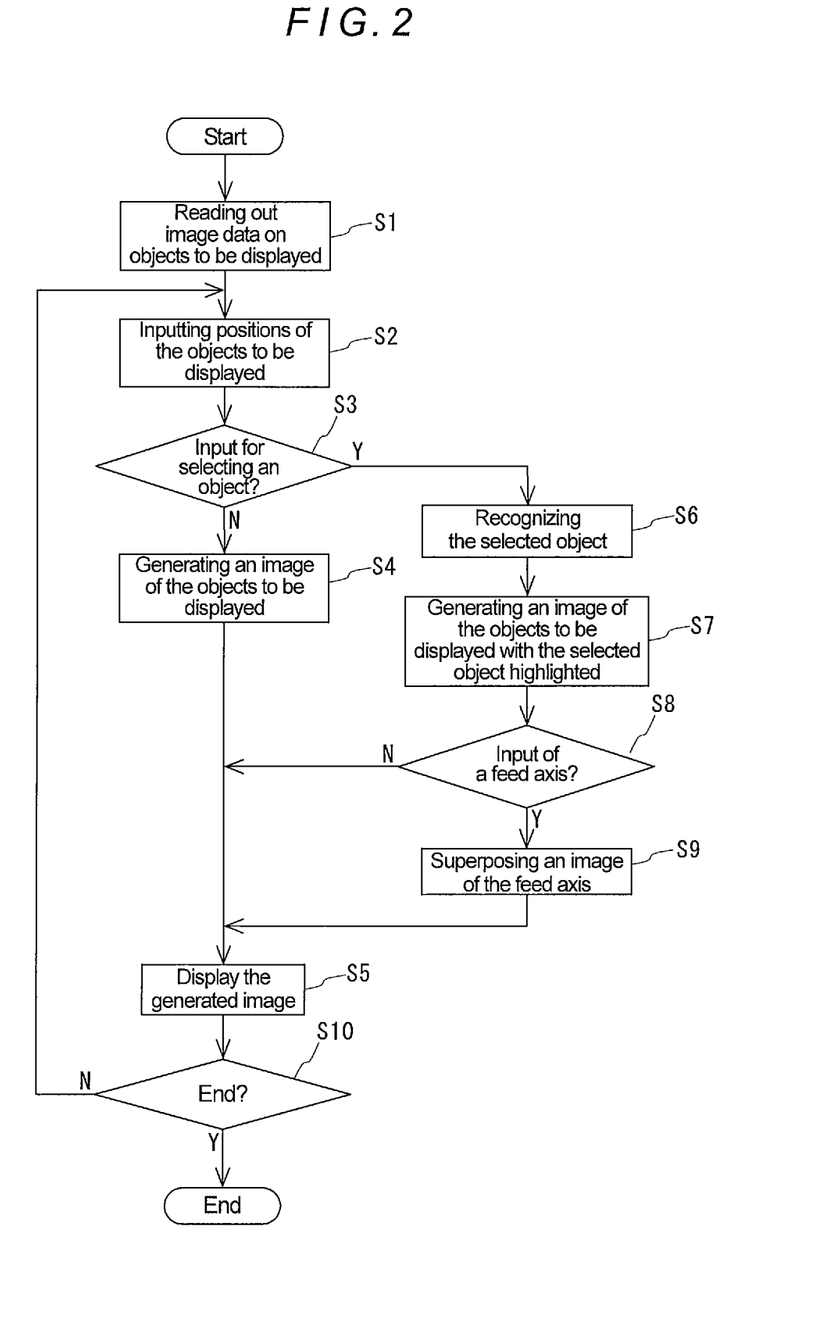
FIG. 2 is a flowchart showing processing in a model image display unit according to the embodiment.

The model image display unit 34 is a processing unit which displays the image of the three-dimensional model of the machining mechanism unit 2 in the image display region 42 of the touch panel 40, and specifically, executes the processing shown in FIG. 2.

That is, as shown in FIG. 2, the model image display unit 34 starts the processing when the display picture switching unit 32 has performed setting for displaying the image of the machining mechanism unit 2. First, the model image display unit 34 reads out the image data relating to the three-dimensional model of the machining mechanism unit 2 stored in the display data storage unit 36 (step S1) and inputs current position data relating to the first tool rest 9, the second tool rest 11 and the third tool rest 13 from the numerical control unit 21 (step S2).

Subsequently, the model image display unit 34 monitors whether any one of the soft keys 61, 62, and 63 displayed on the touch panel 40 is pressed and a selection signal for selecting an object to be operated by a manual operation from the first tool rest 9, the second tool rest 11 and the third tool rest 13 is input form the touch panel 40 (step S3), and, in a case where no selection signal is input, as shown in FIG. 3, generates a display image in which the images of the components of the machining mechanism unit 2, that is, the image 43 of the first headstock 3, the image 44 of the first spindle 4, the image 45 of the first chuck 5, the image 46 of the second headstock 6, the image 47 of the second spindle 7, the image 48 of the second chuck 8, the image 55 of the bed cover 15 and the image 56 of the front door 16 are arranged at predetermined positions and the image 49 of the first tool rest 9, the image 50 of the first turret 10, the image 51 of the second tool rest 11, the image 52 of the second turret 12, the image 53 of the third tool rest 13, and the image 54 of the third turret 14 are arranged to have a positional relationship input from the numerical control unit 21 (step S4), and displays the generated display image in the image display region 42 of the touch panel 40 (step S5).

On the other hand, in a case where a selection signal is input from the touch panel 40 (step S3), the model image display unit 34 recognizes a movable structure corresponding to the selection signal, that is, recognizes which one is selected from the first turret 10, the second turret 12 and the third turret 14 (step S6), and, as shown in FIG. 4, generates a display image such that the image of the selected movable structure (any one of the image 50 of the first turret 10, the image 52 of the second turret 12 and the image 54 of the third turret 14) is highlighted in the display image as generated in step S4, that is, a display image in which the display color of the selected movable structure is set to a color different from that of the other structures (step S7). It is noted that FIG. 4 shows a state where the second turret 12 is selected and the image 52 of the second turret 12 is displayed in black. Further, in this case, the "second system" key 62 is in a state of being pressed, and, because of this pressing, the "second system" key 62 is displayed with the black and white thereof reversed.

Subsequently, the model image display unit 34 monitors whether a jog feed key of the jog feed operation unit 27 is operated and whether a feed axis selection key is operated in the pulse feed operation unit 28, that is, whether an input relating to a feed axis is made (step S8), and, when it is made, the model image display unit 34, as shown in FIG. 4, generates a display image such that an image 57 relating to the feed axis is superposed on the display image generated in step S7 (step S9), and displays the generated display image in the image display region 42 of the touch panel 40 (step S5). It is noted that FIG. 4 shows a case where a signal relating to the Z axis as the feed axis is input from the jog feed operation unit 27 or the pulse feed operation unit 28.

On the other hand, when a signal relating to a feed axis is not input from the jog feed operation unit 27 or the pulse feed operation unit 28 (step S8), the model image display unit 34 displays the display image generated in step S7 in the image display region 42 of the touch panel 40 (step S5). It is noted that the image generated in step S7 is an image such that the image 57 relating to the Z axis is removed from the image shown in FIG. 4.

Further, after the display processing in step S5, the model image display unit 34 repeats the processing from step S2 to step S9 until the setting for displaying the image of the machining mechanism unit 2 is cancelled, that is, ended by the display picture switching unit 32, and, when the setting for displaying the image is cancelled, ends the processing (step S10).

Operations of Machine Tool and Display Apparatus

In the machine tool 1 of this embodiment having the above-described configuration, it is possible to perform an automatic operation in accordance with the programs under the control by the numerical control unit 21 and the PMC 22, and it is possible to manually operate the machining mechanism unit 2 through the operation panel 25.

Further, the display apparatus 30 displays a picture set by the display picture switching unit 32 on the touch panel 40 provided on the operation panel 25. The operator can switch the picture displayed on the touch panel 40 through the display picture switching unit 32 by operating soft keys displayed on the touch panel 40, and thereby can display three-dimensional images of structures of the machining mechanism unit 2 and soft keys as shown in FIG. 3. It is noted that the three-dimensional images of the structures are displayed in the image display region 42 by the model image display unit 34 and the soft keys are displayed in the soft key display region 60 by the picture display unit 35.

The operator can manually operate the machining mechanism unit 2 by operating the soft keys displayed on the touch panel 40 and the spindle operation unit 26, the jog feed operation unit 27 and the pulse feed operation unit 28 provided on the operation panel 25.

When moving any one of the first tool rest 9, the second tool rest 11 and the third tool rest 13 by jog feed or pulse feed, first, the operator selectively presses any one of the "first system" key 61, the "second system" key 62 and the "third system" key 63, which are the soft keys shown in FIG. 3.

Then, for example, when the operator presses the "second system" key 62 for moving the second tool rest 11, a signal indicating that the "second system" key 62 has been pressed is input to the input control unit 33 from the touch panel 40, and the input control unit 33 transmits to the numerical control unit 21 the signal indicating that the "second system" key 62 has been pressed, that is, a selection signal indicating that the second tool rest 11 is selected, and similarly transmits the signal also to the picture display unit 35 and the model image display unit 34. Then, when receiving the selection signal, as shown in FIG. 4, the picture display unit 35 reverses the black and white of the "second system" key 62 and the model image display unit 34 displays the image 52 of the second turret 12 corresponding to the "second system" with it reversed into black.

Thereafter, for example, when the operator selects the Z axis in the pulse feed operation unit 28 or operates a Z-axis-direction jog feed key in the jog feed operation unit 27 for moving the second tool rest 11 in the Z-axis direction, a signal indicating that is transmitted to the numerical control unit 21 and to the model image display unit 34. When receiving the signal, the model image display unit 34 displays the image 57 relating to the Z axis superposed on the image displayed in the image display region 42 as shown in FIG. 4.

It is noted that, in the case where a jog feed key is operated, the numerical control unit 21 moves the second tool rest 11 in the direction corresponding thereto, and in a case of pulse feed, the numerical control unit 21 further moves the second tool rest 11 in accordance with a pulse volume input from the pulse handle of the pulse feed operation unit 28.

Conclusion

Thus, according to the display apparatus 30 of this embodiment, when the operator moves the first tool rest 9 and first turret 10, the second tool rest 11 and second turret 12, or the third tool rest 13 and third turret 14 by a manual operation, the image of the object to be moved selected from among the image 50 of the first turret 10, the image 52 of the second turret 12 and the image 54 of the third turret 14 displayed on the touch panel 40, (in FIG. 4, the image 52 of the second turret 12) is displayed with the black and white thereof reversed, that is, is displayed in a highlighted manner. Therefore, the operator can very easily recognize the movable structure he is going to manually operate by checking the image displayed on the touch panel 40, that is, by checking which image is highlighted.

Therefore, if the operator is going to operate a movable structure different from his intended one, the operator can easily recognize that by checking the display image on the touch panel 40, and it is therefore possible to effectively prevent the occurrence of a collision accident caused by moving a not-intended movable structure by a wrong operation.

Further, since the image of an axis of movement operated by the operator for moving a movable structure is displayed on the touch panel 40, that is, the direction of movement of the operated movable structure is displayed on the touch panel 40, the operator can recognize the direction of movement of the movable structure by checking the display image on the touch panel 40, and can easily recognize whether the movable structure is being moved in his intended direction. Thereby, it is possible to effectively prevent the occurrence of a collision accident caused by movement of the operated movable structure in a non-intended direction due to an operator's wrong operation.

Variation

Figure 5:
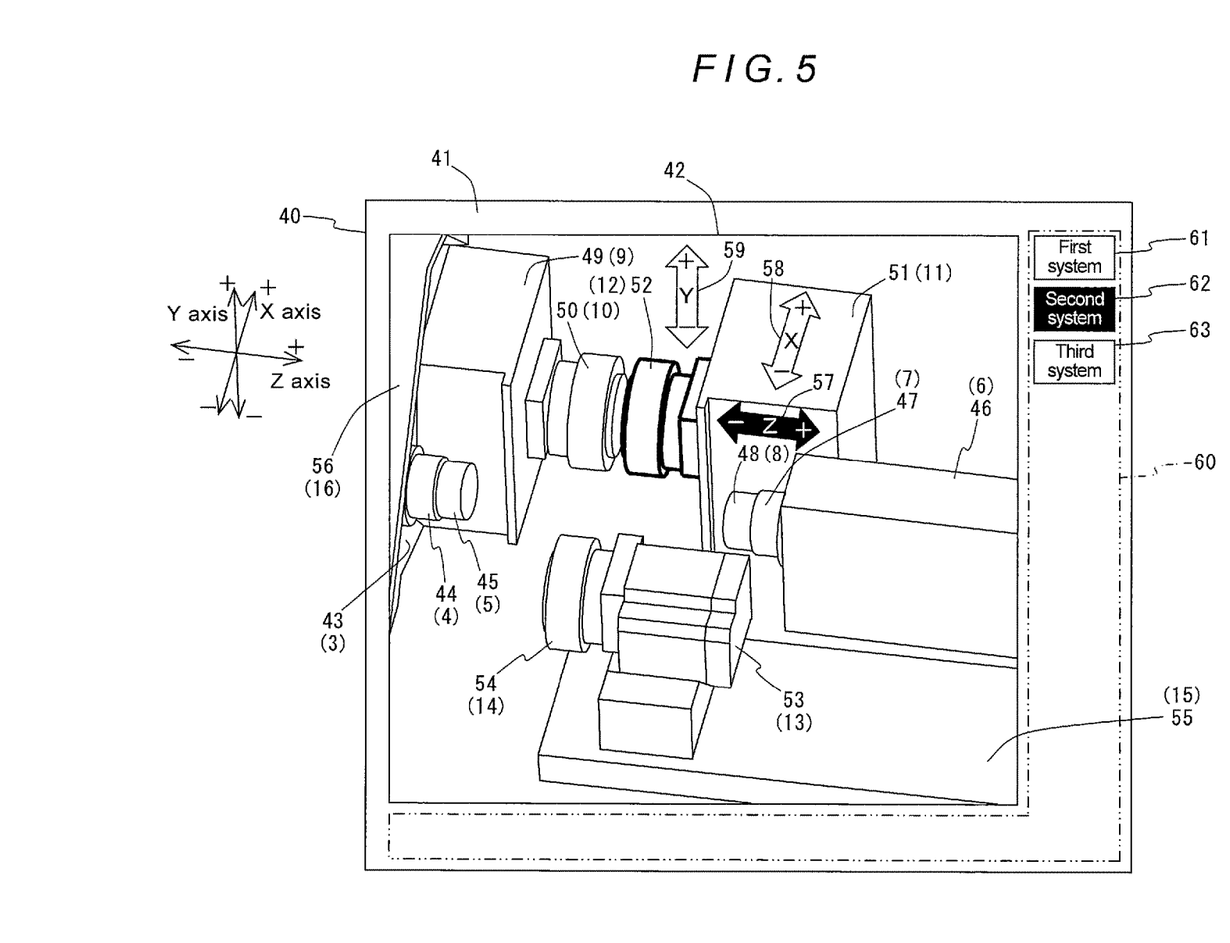
FIG. 5 is an illustration showing a display image according to another embodiment of the present disclosure.

Thus, a specific embodiment of the present disclosure has been described. However, the mode in which the present disclosure can be realized is not limited thereto. For example, although, in the above embodiment, the model image display unit 34 highlights the image of a movable structure selected as the object to be operated (in the above embodiment, the image 52 of the second turret 12) by reversing the black and white thereof, the highlighting manner is not limited thereto and the model image display unit 34 may be configured to highlight the image of the selected movable structure by displaying it in a color different from that of the other structures, by making the profile of the image of the selected movable structure thicker than those of the other images, or by displaying the image of the selected movable structure in a blinking manner. As a specific example, a picture in which an image is highlighted by making the profile thereof thicker is shown in FIG. 5. In FIG. 5, the "second system" is selected and the profile of the image 52 of the turret 12 corresponding thereto is made thicker than those of the other images.

Further, as shown in FIG. 5, the model image display unit 34 may be configured to generate the display image with a highlighted image relating to an axis of movement along which the movable structure selected as the object to be operated can be moved, and display the generated display image in the image display region 42. In FIG. 5, images of axes of movement for the second turret 12, that is, an X-axis image 58, a Y-axis image 59 and a Z-axis image 57, are displayed. When thus configured, the operator can recognize the direction in which the selected movable structure can be moved by the manual operation by checking the display image on the touch panel 40, and therefore can easily recognize in which direction the movable structure is moved by the operation or whether the movable structure can be moved in his intended direction.

Further, in this case, the model image display unit 34 may be configured to display the image of an axis of movement which is operated by the operator for moving the movable structure on the touch panel 40 in a highlighted manner. FIG. 5 shows an example in which, when the operator selects the Z axis as an axis to be operated, the Z-axis image 57 is highlighted by reversing the black and white thereof. It is noted that, as for the highlighted display thereof, similarly to the above, a mode in which the display color thereof is made different from that of the others, a mode in which the profile thereof is made thicker or a mode in which it is displayed in a blinking manner can be employed. When thus configured, as described above, the operator can recognize the direction of movement of the movable structure by checking the display image on the touch panel 40, and therefore can easily recognize whether the movable structure is being moved in his intended direction. Thereby, it is possible to effectively prevent the occurrence of a collision accident caused by movement of the movable structure in a not-intended direction due to an operator's wrong operation.

Further, although, in the above embodiment, the first tool rest 9, the first turret 10, the second tool rest 11, the second turret 12, the third tool rest 13 and the third turret 14 are regarded as the movable structure to be highlighted, the movable structure to be highlighted is not limited thereto and may include the first spindle 4, the first chuck 5, the second spindle 7 and the second chuck 8 also in the above embodiment. It is noted that the movable structure to be highlighted includes any structure which is translationally or rotationally moved, and is various depending on the configuration of the machine tool.

Further, although, in the above embodiment, the displayed image is a three-dimensional image, it may be a two-dimensional image.

What is claimed is:

1. A display apparatus for use with a machine tool having a plurality of movable structures, a driving mechanism driving the movable structures, a numerical controller controlling operation of the driving mechanism, and an input device for inputting an operation signal to the numerical controller, and which displays at least an image relating to the movable structures, comprising:
a display on which the image is displayed;
a display image data storage unit storing therein data associated with the image for displaying the image on the display; and
a display control unit which receives a signal relating to a position of each of the movable structures from the numerical controller and reads out image data relating to the received movable structures from the display image data storage unit, generates a display image in which images of the movable structures are arranged to have a received positional relationship, and displays the generated display image on the display, wherein:
the display control unit further, when a selection signal for selecting a movable structure to be manually operated by an operator is input to the numerical controller from the input device, receives the selection signal and generates the display image with a highlighted image of the movable structure corresponding to the received selection signal, and displays the generated display image on the display.

2. The display apparatus of claim 1, wherein the display control unit generates the display image to which is added an image relating to an axis of movement of the movable structure corresponding to the selection signal input from the input device, and displays the generated display image on the display.

3. The display apparatus of claim 1, wherein when a signal relating to an axis of movement is input to the numerical controller from the input device, the display control unit generates the display image to which an image relating to a corresponding axis of movement is added, and displays the generated display image on the display.

4. The display apparatus of claim 2, wherein when a signal relating to an axis of movement is input to the numerical controller from the input device, the display control unit generates the display image with a highlighted image relating to a corresponding axis of movement, and displays the generated display image on the display.

* * * * *